United States Patent

[11] 3,603,750

| [72] | Inventor | Walo Beier<br>Hegenheimermattweg 42, Allschwil,<br>Switzerland |
|---|---|---|
| [21] | Appl. No. | 863,246 |
| [22] | Filed | Oct. 2, 1969 |
| [45] | Patented | Sept. 7, 1971 |
| [32] | Priority | Oct. 3, 1968 |
| [33] | | Switzerland |
| [31] | | 14783/68 |

[54] ANTITHEFT DEVICE FOR MOTOR VEHICLES
13 Claims, 4 Drawing Figs.

[52] U.S. Cl............................................. 200/44,
307/10 AT, 200/61.19
[51] Int. Cl............................................. H01h 27/00
[50] Field of Search............................................. 200/61.19,
153.14, 42, 44; 340/64; 307/10 AT

[56] References Cited
UNITED STATES PATENTS

| 2,254,347 | 9/1941 | Blakesley | 200/61.19 |
| 2,264,129 | 11/1941 | Catucci | 200/61.19 X |
| 2,295,178 | 9/1942 | Kolias | 340/64 |
| 2,620,387 | 12/1952 | Eberhardt | 340/64 |
| 2,876,429 | 3/1959 | Noztitz | 340/64 |
| 3,059,264 | 10/1962 | Ziegler | 200/61.19 X |
| 3,343,625 | 9/1967 | Scheuermann | 340/64 UX |

*Primary Examiner*—Robert K. Schaefer
*Assistant Examiner*—H. J. Hohauser
*Attorney*—Wenderoth, Lind & Ponack ABSTRACT: This invention relates to an antitheft device, particularly for motor vehicles, which comprises a lockable current switch which can be built into the HT circuit of the ignition system of the vehicle. The device may be inserted in the supply to the distributor or the HT winding of the ignition coil.

PATENTED SEP 7 1971

3,603,750

INVENTOR
WALO BEIER

BY *Wenderoth, Lind & Ponack*
ATTORNEYS

ANTITHEFT DEVICE FOR MOTOR VEHICLES

The present invention relates to an antitheft device for motor vehicles, comprising a circuit interrupter which cannot be tampered with, and which can be built into the high tension circuit of an ignition system. It is the object of the invention to provide, either on the distributor head or on the ignition coil, a circuit interrupter which can be secured against unauthorized interference by locking means, for instance in the form of a safety lock. The proposed antitheft device comprises a connecting portion which is nondetachably affixable to the high tension input terminal of the distributor head or to the output terminal of the ignition coil, an interrupter housing containing an insulating interrupter lockable in its position inside an interrupter chamber by a locking means, a socket embraced by an insulating bushing for connection thereto of the high tension cable between the ignition coil and the distributor and a pair of contacts on supporting arms which connect said contacts to said socket respectively to the central contact element of the distributor or to the insulated end of the high tension winding of the ignition coil. A form of construction which is particularly suitable for subsequent mounting on standard types of distributor heads or ignition coils comprises a connecting portion having an opening for the reception of an insulating bushing surrounding the high tension input terminal of the distributor head or the output terminal of the ignition coil and of a connecting means between the inside wall of said connecting portion and the external surface of the insulating bushing. Said connecting means may be a self-cutting anchoring member which prevents the joint when established from being undone.

The interrupter may be a rotatable disc of insulating material fast on a shaft, a rotatably mounted insulating cylinder or a linearly shiftable rail of insulating material, coupled to a drive member that can be locked by the locking means. One or both sides of the interrupters facing the contacts may be provided with collars or fins of insulating material for increasing the length of the air gap for a spark discharge.

Illustrative embodiments of the invention are shown in the drawing in which.

Figure 1:
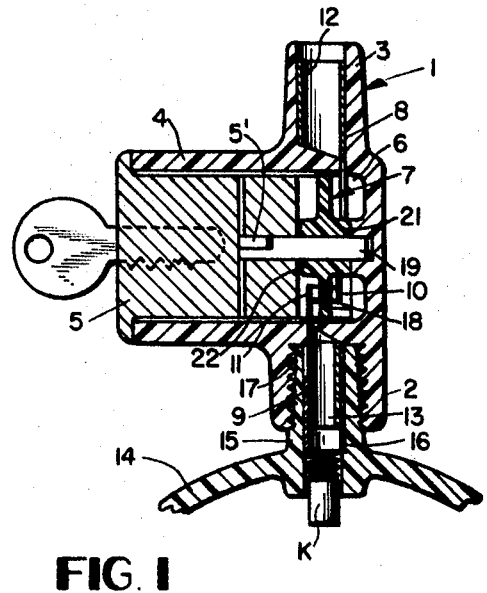
FIG. 1 is a longitudinal section of a first embodiment of the invention.

With reference to FIG. 1 an interrupter casing 1 comprising a connecting portion 2 at the bottom, an insulating bushing 3 at the top and a tubular receptacle 4 for a locking means in the form of a safety lock, generally indicated in the drawing by reference number 5, but not otherwise shown in detail. The openings formed by the three portions 2, 3 and 4 communicate either directly or through bores of smaller diameter with a central interrupter chamber 6 containing an interrupter disc 7 made of an insulating material of suitable electrical breakdown strength, as well as contacts 10 and 11 on the ends of supporting arms 8 and 9. The arms of the contact points are connected to the sockets 12 and 13 of pin type connections.

The antitheft device shown in FIG. 1 is mounted on the high tension input terminal of a distributor head 14. Instead of being mounted on the distributor head 14 the device could also be fitted to the head of an ignition coil (not shown) which in the same way as the distributor head contains a socket 16 embraced by a slightly coned bushing 15 of insulating material, said socket normally serving for the reception of a high tension connector (not shown). The inside wall of the connecting portion 2 contains a connecting means in the form of a self-cutting anchoring device, as available in the trade, which is firmly anchored to the wall. When the illustrated device is mounted on the terminal of the distributor or of the ignition coil the inwardly projecting teeth of the anchoring member penetrate the surface of the insulating bushing 15 and of the wall of the bore of the connecting portion 2 and thereby establish a joint between the connecting portion 2 and the bushing 15 which is practically impossible to undo, and which can be even further improved by introducing a little adhesive. Naturally there are alternatives for establishing such a joint which is primarily intended to be impossible to undo to prevent the antitheft device from being removed without the application of force. It would obviously also be possible for the insulating member of the distributor head or the cover on the high tension terminal of the ignition coil to be of integral construction with the interrupter casing 1, or the cooperating parts could be permanently joined in some other way.

Figure 2:
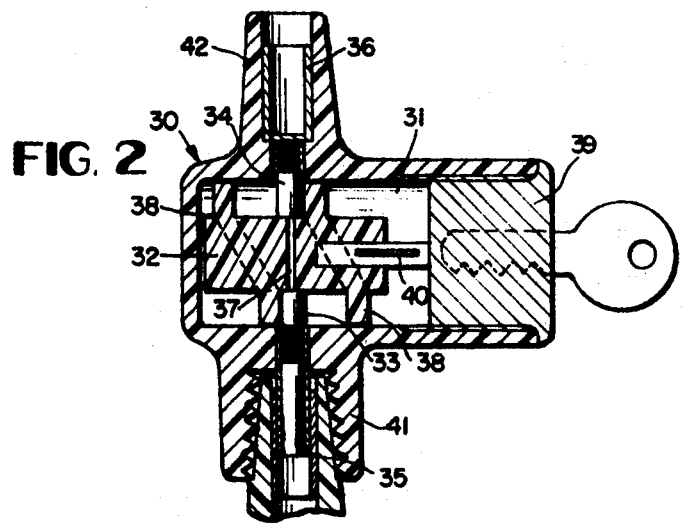
FIG. 2 is a longitudinal section of a second embodiment.

The described features of the casing 1 and of its component parts and the manner of its association with the distributor or the ignition coil also apply in principle to the embodiments of the device that are shown in FIG. 2, the difference between the several embodiments residing particularly in the manner of construction of the electrical interrupter inside the interrupter chamber.

Figures 1A, 1B:
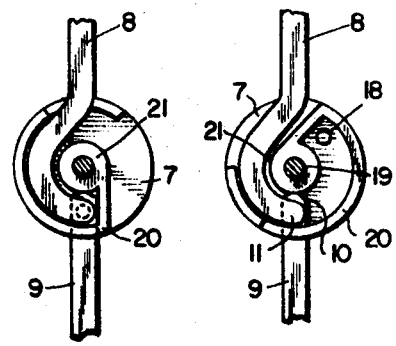
FIGS. 1a and 1b show the disc-shaped interrupter of the embodiment in FIG. 1 in its "on" and "off" positions.

In the embodiment according to FIG. 1 an insulating disc 7 is interposed between the contacts 10 and 11. In the illustrated "on" position a contact pin 18 which penetrates the disc at a point offset from but substantially parallel to the shaft 19 carrying the disc, bridges the insulating gap formed by the disc between the two contact points. The shaft 19 is coupled to the driven member 5' of a safety lock 5 and can be rotated by operation of the lock to move said contact pin from its "on" position shown in FIG. 1a into an "off" position shown in FIG. 1b. For increasing the length of the spark gap the disc 7 is provided with an insulating collar 20 which embraces part of the circumference of the disc. To prevent flashover to the shaft the disc is integrally formed with two hubs 21, 22.

The interrupter in the embodiment shown in FIG. 2 is an insulating cylinder 32 which is rotatably mounted in a cylindrical chamber 31 inside the interrupter casing 30. A pin 37 passes diametrically through the cylinder and forms a conducting element between two sprung contacts 33, 34 connected to sockets 35, 36 equivalent to the parts 12 and 13 in FIG. 1. On its peripheral surface the insulating cylinder 32 has a helical fin 38 of insulating material which performs three separate functions. Firstly it locates the cylinder 32 inside the interrupter chamber 31 and keeps it in axial alignment therein. Secondly, when the cylinder is turned to interrupt the connection between the contacts, it causes the pin 37 to be axially moved out of the plane containing the two contacts 33, 34, since the flanks of the fin bear against said contacts. Thirdly, the fin increases the length of the air gap between the two contacts. Interposed between a locking member in the form of a safety lock 39 and the cylinder 32 a drive member 40 transmits the required rotation and thereby also causes the axial displacement of the cylinder.

As already mentioned the device may be mounted on a distributor head or on an ignition coil in the manner described with reference to FIG. 1, the connection portion marked 41 performing the functions of part 2 in FIG. 1, or alternatively the safety device may be integral with insulating parts of said components.

Although the invention has been described with reference to three typical embodiments, other variants can be readily devised. The essential feature of these devices must be that they reliably interrupt an electrical circuit established by contacts, that the joint between the device and the distributor head or the high tension bushing of the ignition coil should be permanent and impossible to undo, and that operation is by means of a locking means that is safe against unauthorized interference, and that need not necessarily be a safety lock (as illustrated). The insulating provided by the interrupter gap inside the described antitheft device may be improved by filling it with a suitable, possibly liquid dielectric medium.

1. An antitheft device particularly for motor vehicles having an interrupter secured against unauthorized interference in the high tension circuit of the ignition system between the ignition coil and the distributor comprising a securely fixed casing in said circuit 1, 30 having an interrupter chamber 6, 31, a safety lock in said chamber, an insulating element 7, 32 having a conductor bridge 18, 37 controlled by said safety lock, insulating means 20, 38 on said insulating element for increasing the current gap in said chamber movable between two end positions, a pair of contact arms connected in said circuit extending into said chamber having contacts 10, 11, 33, 34, said contacts being located upon opposite sides of said insulating element so that said insulating element in one position of said end positions in the interrupter casing is lockable by said safety lock 5, 39 to break said high tension circuit and said conductor bridge 18, 37 and in the other of said end positions establishes a connection between said contacts and with one of said contact arms for reestablishing said high tension circuit between the ignition coil and the distributor.

2. A device as set forth in claim 1, wherein said casing is provided with a connecting portion having an opening, an insulating bushing in said opening surrounding the high tension input of said high tension circuit and a connecting means between the inside wall of said connecting portion and the external surface of said insulating bushing.

3. A device as set forth in claim 2, wherein said connecting means is a self-cutting anchoring member preventing the joint between said connection portion and said bushing from being undone.

4. A device as set forth in claim 2, wherein said connection portion is integral with the distributor head.

5. A device as set forth in claim 2, wherein said connecting portion is integral with the output side of the ignition coil.

6. A device as set forth in claim 2, wherein one of said contact arms is directly connected with the central contact member of the distributor.

7. A device as set forth in claim 2, wherein one of said contact arms is directly connected to the insulated end of the high tension winding of the ignition coil.

8. A device as set forth in claim 1, wherein said insulating element is a rotatable disk of insulating material, a shaft on which said disk is rotatably mounted in said chamber, and means connecting said shaft with said safety lock.

9. A device as set forth in claim 8, wherein said disk is fitted with a contact pin traversing said disk substantially parallel to said shaft, said contact pin forming said conductor bridge.

10. A device as set forth in claim 8, wherein said disk is provided with an insulating coil forming said insulating means.

11. A device as set forth in claim 1, wherein said interrupter is a rotatable insulating cylinder having a conducting element for the high tension circuit.

12. A device as set forth in claim 11, wherein said cylinder is rotatably mounted in said chamber and is coupled to a drive member releasable by said safety lock for the transmission of rotation.

13. A device as set forth in claim 11, wherein said insulating cylinder has a helical insulating fin on its peripheral surface.